United States Patent [19]
Alsop et al.

[11] Patent Number: 6,069,228
[45] Date of Patent: May 30, 2000

[54] PROCESS FOR PREPARING POLYAMIDES

[75] Inventors: Albert Walter Alsop; Elwood Neal Blanchard, both of Wilmington, Del.; Jeffrey D. Cohen, Kennett Square, Pa.; John Maurice Iwasyk, Wilmington, Del.; Clara Young Lin, Hockessin, Del.; David Neil Marks, Newark, Del.; Jan M. Stouffer, Washington, W. Va.

[73] Assignee: E. I. du Pont de Nemours and Company, Wilmington, Del.

[21] Appl. No.: 09/135,225

[22] Filed: Aug. 17, 1998

[51] Int. Cl.⁷ .............................. C08G 69/08; C08G 73/10
[52] U.S. Cl. ...................... 528/310; 528/312; 528/323; 528/326; 528/332; 528/335; 528/336; 528/342
[58] Field of Search ...................................... 528/312, 323, 528/326, 342, 332, 335, 310, 336

[56] References Cited

U.S. PATENT DOCUMENTS

| | | | |
|---|---|---|---|
| 3,031,433 | 4/1962 | Monroe, Jr. ............................... | 260/78 |
| 4,049,638 | 9/1977 | Doerfel et al. ........................ | 260/78 L |
| 4,539,391 | 9/1985 | Pipper et al. ............................ | 528/323 |
| 5,519,097 | 5/1996 | Meyer et al. ............................. | 526/64 |
| 5,596,070 | 1/1997 | Gotz ........................................ | 528/310 |

FOREIGN PATENT DOCUMENTS

| | | | |
|---|---|---|---|
| PCT/EP94/ 01998 | 6/1994 | European Pat. Off. ........ | C08G 69/16 |
| 1965077 | 3/1998 | Germany ........................ | C08G 69/00 |
| WO 94/21711 | 9/1994 | WIPO ............................ | C08G 69/30 |
| WO 98/08889 | 3/1998 | WIPO ............................ | C08G 69/00 |

*Primary Examiner*—P. Hampton-Hightower

[57] ABSTRACT

Disclosed is a process for the preparation of polyamide polymers via prepolymer formation in a reactor system comprising a reactor, flasher and separator, crystallization of the prepolymer under controlled temperature conditions and the subsequent conversion of these crystallized prepolymers to high molecular weight polymer.

29 Claims, 8 Drawing Sheets

PROCESS FOR PREPARING POLYAMIDES

FIELD OF THE INVENTION

This invention concerns a process for the preparation of polyamide polymers via prepolymer formation in a reactor system comprising a reactor, a flasher and a separator, crystallization of the prepolymer under controlled temperature conditions and the subsequent conversion of the crystallized prepolymer to high molecular weight polymer.

TECHNICAL BACKGROUND

U.S. Pat. No. 3,031,433, U.S. Pat. No. 4,049,638, U.S. Pat. No. 5,519,097, and EP 94/01998 disclose single stage pipeline polyamide reactors operating at pressures above the vapor pressure of aqueous caprolactam feed solutions, such that only a single liquid phase will be present. None of these references disclose operation of a reactor system comprising a reactor, a flasher and a separator, wherein the reactor is operated below the system vapor pressure so that boiling occurs and results in operation in a two phase (gas/liquid) region.

U.S. Pat. No. 4,539,391 discloses first stage pipeline reactors operating at reactor pressures under 10 bar (145 psig, 130.3 psig, 1000 kPa) and reactor residence times of under 10 minutes. U.S. Pat. No. 4,539,391 does not disclose operation at pressures between 10 bar (145 psig, 130.3 psig, 1000 kPa) and the system vapor pressure and the resulting benefit of providing sufficient pressure to drive the flasher stage that follows the reactor, nor the advantage of longer residence times between 10 and 180 minutes to allow for higher conversions of monomer to prepolymer with minimum cyclic prepolymer formation. The '391 patent further discloses that following the pipeline reactor is a high pressure separator operating at the same pressure as the reactor. The prepolymer exiting from this separator has a high level of extractable impurities (10 to 11% by weight).

The process of the present invention differs from U.S. Pat. No. 4,539,391 in that a low holdup time flasher follows the reactor stage which lets down the pressure and strips off the extractable impurities. Further, in the process of the present invention, a very low holdup time 1 atm.(101 kPa) separator follows the flasher which produces prepolymer with low levels of extractable impurities. The '391 patent discloses the need for water extraction of extractable impurities. The product of the process of the present invention does not require water extraction.

DE 196 35 077 A1 discloses a process for the continuous preparation of polyamides from omega-aminoalkylnitriles, specifically 6-aminocapronitrile, comprising three process steps, the first of which is a single phase reaction of the omega aminoalkylnitrile in water.

WO 98/08889 discloses a multi stage process for producing polyamides from aminonitriles under specified temperature and pressure conditions.

U.S. Pat. No. 5,596,070 discloses a process for the preparation of high molecular weight polyamides from cyano or amino containing monomers wherein the final solid state polymerization step is carried out in the presence of an inert gas which contains at least 50% by volume of superheated steam

SUMMARY OF THE INVENTION

The present invention describes a process for the preparation of polyamide prepolymers, possessing less than about 6% of extractable impurities, comprising the steps of:

(a) prepolymerizing a polyamidation precursor selected from the group consisting of a polyamidation monomer, a mixture of polyarnidation monomers and a mixture of polyamidation monomers and comonomers in a polyamidation reactor, in the presence of a flowing vapor phase for between 10–600 minutes at pressures between 10 bar (145 psig, 130.3 psig, 1000 kPa) and the system vapor pressure so that boiling occurs resulting in operation in a two phase (vapor phase/liquid phase) region to form a polyamide prepolymer;

(b) flashing excess dissolved liquid vapor and reaction product volatiles into the vapor phase by passing the liquid prepolymer solution/vapor stream through a flasher stage that follows the reactor to let down the pressure to approximately 1 atmosphere (101 kPa) and to strip off the extractable impurities; and (c) passing the flasher effluent through a very low holdup time separator at about 1 atm. (101 kPa) that follows the flasher.

In a preferred embodiment the polyamidation precursor in step (a) is caprolactam. It is also preferred to have the flowing vapor flow concurrently with the process material. The time in step (a) is preferably between 10 and 180 minutes and where the reactor is a pipeline reactor.

Another polyamidation precursor is an amino nitrile monomer, preferably 6-aminocapronitrile. The 6-aminocapronitrile may be supplied as an aqueous solution and a polyamidation catalyst may be used. Where such catalyst is used, after step (a) and before step (c) an aqueous solution of a polyamidation catalyst deactivator, such as potassium carbonate or potassium bicarbonate, may be injected.

Also disclosed herein is a process for the preparation of crystalline polyamide prepolymers, wherein said prepolymers are prepared according to the above processes, comprising crystallizing a polyamide prepolymer having a molecular weight between 3,000 and 10,000, essentially isothermally, at a temperature (Tc) within plus or minus 20° C. of the temperature of maximum crystallization rate, provided that Tc is 30 or more degrees below the melting point of the polyamide prepolymer.

In a preferred embodiment a nylon 6 polyamide prepolymer is crystallized essentially isothermally, at a temperature of about 130° C. to 170° C., most preferably 140° C. to 160° C.

Further disclosed is a process for the preparation of high molecular weight polyamide polymer comprising the steps of:

(a) crystallizing a polyamide prepolymer according to the above process; and (b) solid state polymerizing the crystallized polyamide prepolymer, in the presence of a inert gas having a superficial gas velocity of about 0.1 to 2 ft/sec., and at temperatures of at least about 1° C. below the softening point of the crystallized polyamide prepolymer as indicated by DSC curves. The inert gas preferably contains less than about 30 volume % water vapor, more preferably less than 10 volume % and most preferably less than 5 volume %. It is also preferred if the solid state polymerization is carried out at least 5° C. below the softening point of the crystallized polyamide prepolymer.

Also disclosed is a process for rapid solid phase processing and vapor phase extraction of impurities of nylon 6 polyamide polymers or their copolymers comprising:

(i) supplying low extractable content crystalline nylon-6 polyamide prepolymers or copolymers to a solid state polymerizer; and (ii) solid state polymerizing in the presence of an inert gas having a superficial gas velocity of about 0.1 to 2 ft/sec. and at temperatures of at least about 1° C. below the softening point as indicated by DSC curves, wherein polyamide precursor is removed and molecular weight of the resulting polymer is increased. In a preferred product the total extractables in the product are less than 2%.

DETAILED DESCRIPTION OF THE INVENTION

Figure 1:
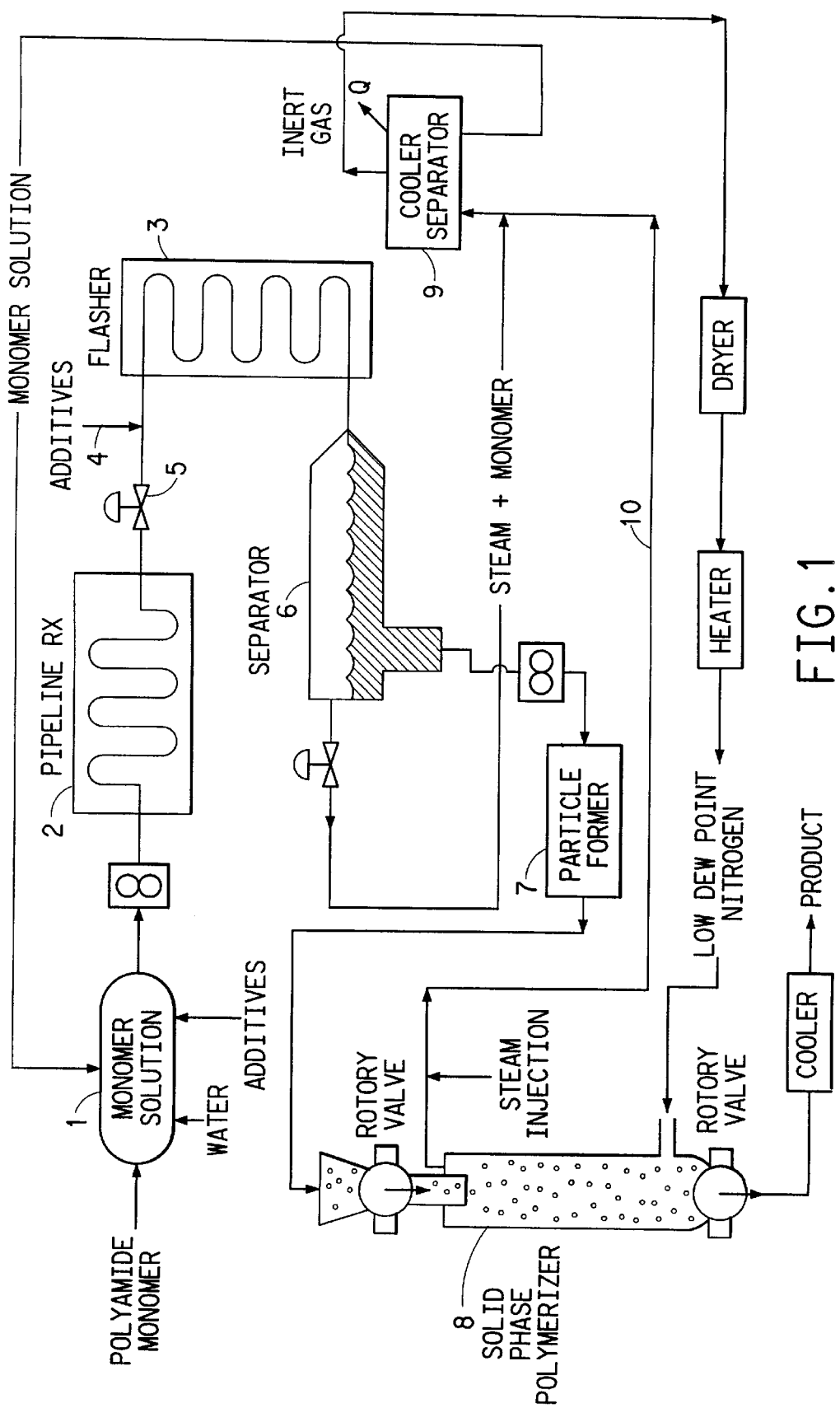
FIG. 1 is a process schematic for the preparation of nylon 6 from an aqueous solution of caprolactam.

The overall route to polyamide polymers, employing the processes of the present invention comprises three process steps, A) prepolymerization of polyamidation monomers in a reactor system comprising a reactor, a flasher and a separator to form polyamide prepolymers;

B) formation of at least partially crystalline particles of the polyamide prepolymer under proper conditions for optimal operation in the subsequent solid phase polymerization (SPP); and C) solid phase polymerization of the polyamide prepolymer to higher molecular weight product specifications.

A) PREPOLYMERIZATION

Monomers or polyamidation polymerization ingredient solutions or melts are metered into a reactor operating at sufficient temperature and kept at certain residence time to rapidly form a prepolymer of sufficient degree of polymerization to produce a prepolymer melt viscosity that is optimal for subsequent gas disengagement and prepolymer particle formation. Operating temperatures and residence times are chosen to avoid undesirable side reactions and byproducts. The pressure in this reactor is sufficiently high to maintain an optimal amount of liquid phase of each of the reactants. Reaction byproducts can vaporize into a flowing gas phase which can provide enhanced performance with regard to heat and mass transfer in the reactor. Stable vertical two phase flow can be utilized to promote back mixing for the sake of enhancing conversion by promoting gas/liquid contact. Additives can be injected into this reactor stage if desired.

The reactor of the present invention can be used for the prepolymerization of monomers or comonomers supplied as aqueous solutions of various concentrations, for example aqueous lactam or copolymer solutions of 5 to 25% water, preferably between 10 to 20% water. Caprolactam and higher lactams up to 12 ring members or mixtures thereof are suitable. Other feed materials include amino-nitriles, where higher concentrations of water, approximately 50 wt %, may be employed, mixtures of aliphatic, aromatic or heterocylic dicarboxylic acids and diamines or their salts and mixtures of diamines and dinitriles. Preferred monomers are caprolactam and 6-aminocapronitrile. Additives, such as catalysts, delustrants, and stabilizers, can be introduced in the reactor feed. Other polyamide feeds including the homopolymers and copolymers of the salts of dicarboxylic acids and diamines can be used. Other polyamide copolymers, such as copolymers with condensation polymers, including polyesters and polycarbonates can also be used as feed.

Specific examples of dicarboxylic acids include glutaric acid, adipic acid, suberic acid, sebacic acid, dodecanedioic acid; 1,2-or 1,3-cyclohexane dicarboxylic acid; 1,2-or 1,3-phenylene diacetic acid; 1,2-or 1,3-cylohexane diacetic acid; isophthalic acid; terephthalic acid; 4,4'-oxybis(benzoic acid); 4,4'-benzophenone dicarboxylic acid; 2,5-naphthalene dicarboxylic acid; and p-t-butyl isophthalic acid. The preferred dicarboxylic acid is adipic acid.

Specific examples of diamines include hexamethylene diamine; 2-methyl pentamethylenediamine; 2-methyl hexamethylene diamine; 3-methyl hexa-methylene diamine; 2,5-dimethyl hexamethylene diamine; 2,2-dimethylpentamethylene diamine; 5-methylnonane diamine; dodecamethylene diamine; 2,2,4-and 2,4,4-trimethyl hexamethylene diamine; 2,2,7,7-tetramethyl octamethylene diamine; meta-xylylene diamine; paraxylylene diamine; diaminodicyclohexyl methane and $C_2$–$C_{16}$ aliphatic diamines which may be substituted with one or more alkyl groups. The preferred diamine is hexamethylene diamine.

Alternate starting monomers, having a carboxylic acid functional group and an amino functional group or a functional precursor to such a compound, may be selected form 6-aminohexanoic acid; caprolactam; 5-aminopentanoic acid;

7-aminoheptanoic acid and the like.

The temperature employed in the reactor, flasher and separator of the present invention can range from 190° C. to 320° C., typically from 240° C. to 290° C. The pressure employed in the reactor is above 130 psig (1000 kPa), preferably, above 250 psig (1825 kPa) but below the solution vapor pressure.

The first reactor may be a pipeline reactor. By "pipeline reactor" is meant herein an axially elongated, substantially cylindrically-shaped apparatus, although shapes may vary depending upon the purpose of the reactor. The reactor can be divided into two or more stages operating at various pressures. Vapor flow in a pipeline reactor may be cocurrent or countercurrent.

Various additive solutions may be injected into and mixed in any stage such that vapors will flow in a cocurrent or countercurrent fashion in one or all reactor stages. Vapor may be vented at several positons in the reactor stage. The pipeline may be vertical or horizontal and can contain suitable inserts to promote mixing, surface generation for promoting heat or mass transfer, optimal fluid flow patterns and minimal liquid entrainment in the vapor sections.

The liquid residence time in the reactor is between 10 minutes and 180 minutes, preferably 20 minutes to 90 minutes, when aqueous lactam feeds are employed. Longer residence times, up to 600 minutes, may be employed when amino nitrile monomers are employed. The residence time and temperature are chosen for maximum conversion of monomers with a close approach to equilibrium prepolymer molecular weight and minimal side products.

The prepolymer reactor is followed by a flashing stage. In this stage, pressure is carefully reduced and temperature is raised by selecting appropriate pipe diameters and lengths to maximize vaporization of gaseous products while avoiding unstable flow conditions and freezing out of the prepolymer as the pressure is reduced.

Minimum holdup time and optimal temperatures are chosen in order to minimize formation of higher molecular weight prepolymers as well as to optimize stripping out of volatile byproducts from the prepolymer so that optimal heat and mass transfer can be maintained and optimal prepolymer particle formation can occur in subsequent steps. An annular two phase flow regime is employed in order to enhance mass transfer for stripping out the extractable impurities and to optimize heat transfer. Additives can be injected at the entrance of the flasher. Inert gases can also be injected at the entrance of the flasher to provide a driving force for polymerization reactions that require a stripping agent to enhance mass transfer and to drive the reaction mixture through the flasher. Entrainment devices can be utilized to reduce liquid carryover in the vapor phase and out of the separator. A pressure control valve may be placed between the reactor and the flasher for convenience, but is not necessary.

The flasher typically operates at temperatures sufficient to efficiently strip or boil off extractable impurities from the polyamide prepolymer of the present invention. The residence time is typically 1–5 minutes. Constant temperature operation may be desirable.

The final prepolymerization step is a polymer/gas separator which allows gas disengagement such that very uniform particles can be subsequently produced. Temperature, residence time and pressure are controlled such that the melt viscosity of the prepolymer is low enough to minimize the formation of extractable impurities and to optimize particle formation in the next stage. The separator geometry is chosen to accommodate the frothing and foaming that occurs at the exit of the flasher so that gaseous products can easily disengage and uniform prepolymer particles can be formed in the subsequent step. The degree of polymerization and the polymer temperature determine the polymer throughput range and are specific to the polyamidation polymer being produced by this process. The separator is designed to minimize prepolymer entrainment in the off gas stream.

As an alternative to the above described pipeline reactor process, different prepolymerization processes may be employed to prepare polyamide prepolymers for delivery to the subsequent stages of the process of the present invention. Anhydrous anionic lactam/catalyst prepolymerization processes can be used. For anionic polymerization compositions reaction times may be below 20 minutes dependent on the efficacy of the catalyst employed.

B) PREPOLYMER PARTICLE FORMATION

Prepolymer from the prepolymerization process is then metered to a particle formation device that provides a controlled temperature-time profile for solidifying the prepolymer to achieve an optimum morphology. For semicrystalline prepolymers such as polyamides (nylon 66 and 6) the temperature is chosen to coincide with the optimum crystallization nucleation and crystal growth rate so that optimal solid phase polymerization can be carried out in the subsequent step C). The particle formation device is designed to produce a uniform particle size distribution and to avoid fines production.

C) SOLID PHASE POLYMERIZATION

The last process step in the solid state polymerization process of the present invention is the solid phase polymerization of the particles of low molecular weight polyamide prepolymer. Previously known solid phase polymerization processes usually start with high molecular weight polymer (above 15,000 molecular weight) having uniform granulated polymer particles produced under fiber or strand forming conditions. A semicrystalline particle is solid phase processed under conditions which avoid particle agglomeration at temperatures sufficient for reasonable processing times (usually 24–48 hours). In the process of the present invention, polyamide prepolymers of under 10,000 molecular weight are solid phase polymerized under conditions which take advantage of the faster crystallization rates and lower content of extractable impurities of the polyamide prepolymer of the present invention. The level of extractables (or extractable impurities) is determined by mixing one gram of polymer with 5 mL of methanol, then heating the mixture to 65° C. for 16 hours in a closed hydrolysis tube. After cooling, the methanol solution is analyzed by gas chromatography.

In the preferred case, when the processes of the present invention are employed to prepare nylon 6, there is an additional advantage in the solid phase polymerization in that the softening point of the prepolymer will rise with increased crystallization temperatures. Also, a more favorable crystalline phase, i.e., the alpha phase for nylon 6, is formed which is more suitable for solid phase reactions. For the purpose of this description, softening point is described as the temperature at which the DSC curve, obtained during sample heatup, begins to indicate an endotherm associated with polymer melting.

UTILITY OF THE INVENTION

The main advantage of the process of the present invention over previous polymerization polyamidation processes is the need for significantly lower investment versus the usual melt polymerization finishing and solid phase polymerization processing of high molecular weight polyamidation polymers. This results in favorable economics by avoiding long holdup time reactors, water extractors, driers and evaporator steps. The ability to control the crystallization morphology by optimal particle formation techniques for the prepolymer results in solid phase operational advantages such as operation at higher temperatures, significantly shorter residence times, non-agglomeration of particles and impurity removal during solid phase polymerization.

A further advantage of the present invention is that it can avoid polymer oxidation and degradation because all components are sealed and blanketed against air contact.

For the preferred case, where the process of the present invention is used to prepare nylon 6, this invention offers advantages in that it yields products with much lower levels of extractable impurities, much lower degradation, potentially higher crystallization rates, and higher softening temperatures.

This invention can be used for the preparation of many polyamidation prepolymers that can be finished by solid phase polymerization. Solid phase polymerization can be carried out for semicrystalline polymers just below the softening point and above the glass transition temperature to avoid particle agglomeration. The preparation of prepolymer particles for optimal solid phase polymerization results in a final product suitable for molding resins, fibers or films.

The process of the present invention also has utility for the production of polyamides and for other polyarnidation polymers such as polyamide copolymers, polyimide homopolymers and copolymers, high temperature nylons and the like. A preferred use is for the production of polyamides, for example nylon 6 and nylon 66. The details of this invention are specifically described below for the preferred polyamide nylon 6.

As shown in FIG. 1, which is a process schematic for the preparation of nylon 6, an aqueous solution (1) of caprolactam with a water content of 5 to 25% by weight is metered into a pipeline reactor (2). This amount of water is preferred for three reasons, 1) it aids hydrolysis of caprolactam to form aminocaproic acid which is a precursor for polycaprolactam, 2) it assists efficient operation of the subsequent flasher stage of this invention and 3) it allows effective removal of extractable impurities from the prepolymer in the flasher stage (3). Additives such as catalysts, polymer stabilizers, antioxidants and delusterants can be added to the aqueous feed solution of caprolactam or metered into the flasher inlet (4).

The pipeline reactor is operated at sufficient temperature, constant pressure, and residence time to achieve conversions of over 85% of the caprolactam. The reactor operates below the solution vapor pressure to allow two phase flow to promote effective mixing and avoid stagnation. Operation of the pipeline stage at temperatures between 240° C. and 290° C. and pressures of 300 to 800 psig (2170 to 5617 kpascal) are preferred such that residence times of 15 to 60 minutes can be used for achieving the desired conversion. Higher residence time reactors can be used for other polyamide monomer systems. Catalysts for promoting the hydrolysis of caprolactam, such as phosphoric acid or polyamide salts, can be used. Operation of the reactor at these low holdup times and temperature conditions is important to minimize the formation of higher molecular weight cyclic prepolymers which degrade the product and are difficult to steam or vacuum extract because of their very high melting points. The holdup time, temperature, and pressure conditions in the reactor are also critical for determining the prepolymer molecular weight, which in turn establishes the melt viscosity (at a given temperature) for the subsequently formed prepolymer particles.

The pipeline reactor can be designed according to principles familiar to those skilled in the art of polymer reactor design. A preferred geometry is a helical coil or coils shown in FIG. 1, such that vertical stable two phase flow is obtained so that there is back mixing in the rising vertical sections to increase the contact of caprolactam vapor with the liquid prepolymer stream and thus promote the addition reaction (caprolactam+amine end group→amide link). Upstream of the reactor there can optionally be a series of parallel tubes or plates to provide heat transfer area for rapid heatup. The reactors can be heated with a condensing high temperature heating fluid such as Dowtherm A® or a high temperature oil to maintain operating temperature and support the endothermic heat of reaction. The reactor pressure can be controlled by means of a pressure control valve or by the pressure drop in the flasher stage. The reactor pressure is selected for maximum conversion and also to allow sufficient vaporization in the reactor stage so that the temperature drop across the pressure letdown valve (5) is the usual adiabatic gas temperature drop of 10 to 20° C. If the reactor pressure is above the vapor pressure of the prepolymer composition, large adiabatic temperature drops due to flashing of steam from liquid water will occur and the undesirable freezing out of prepolymer downstream of the letdown valve may occur. The residence time in the reactor is selected by principles known to those skilled in the art of two phase flow reactor design and the chemical kinetics of polymerization for over 85% conversion of the caprolactam solution to prepolymer of a number average molecular mass >2000. Residence time and reaction temperatures are held to minimum to keep the by-product extractable impurity formation to a minimum.

A flasher (3) is connected directly to the reactor. A pressure control valve can be used to separate the reactor and flasher but is not required if the flasher is designed to the following standards. The flasher is a series of carefullly designed increasing diameter pipes in which the pressure is reduced while increasing or holding temperature constant while dissolved or chemical water and extractable impurities are flashed into the gas phase. Two phase concurrent flow (gas/viscous liquid) annular or semiannular flow is designed into the flasher for stability and maximum mass and heat transfer. The process of the present invention requires a low holdup time flasher (i.e., less than 5 minutes) to keep the prepolymer molecular weight from rising above the fiber forming melt viscosity level at which level bubble disengagement of steam and extractable impurities would be retarded. As the pressure is let down steam stripping of the nylon 6 extractable impurities will occur producing a low extractable content prepolymer at the flasher exit. The temperature of the flasher is maintained as high as possible to promote the extraction of low molecular weight compounds by the boiling, frothing, or foaming of the prepolymer mixture. The flasher residence time and temperature are chosen to also minimize the formation of by-product low molecular weight extractable impurities.

A gas/liquid separator (6) follows the flasher step in which by-product gases are separated from the prepolymer. The prepolymer melt viscosity is controlled to allow gas bubbles to disengage rapidly. A low residence time (<5 min.) is utilized for the molten pool of prepolymer which is then metered into a prepolymer particle forming device (7). The gases are sent to a recovery step (9) followed by recycle of aqueous monomer (e.g., caprolactam and oligomer) solution back to the pipeline reactor. The separator may be cooled down to just above the prepolymer freezing point to retard molecular weight increase and bubble formation in the prepolymer melt. The separator can be operated at above or below atmospheric pressure but supra-atmospheric pressure is preferred to inhibit further polymerization and bubble formation. It has also been found that the presence of steam diffusing out of the prepolymer particle shields the particle from air oxidation producing good color product during the subsequent particle formation process.

The prepolymer particle formation device (7) is selected from a number of devices used by those skilled in the art that give particles that are suitable for solid phase finishing and the final product specification. This prepolymer process of the present invention provides either a low melt viscosity for bead-like particle formation or higher melt viscosities suitable for the formation of strand that can be cooled and cut into granules. The particles can be formed according to a controlled time temperature profile allowing for optimal crystallization formation in the final polyamide particle. This procedure for particle formation from prepolymer melts can greatly enhance the performance of moving bed solid phase finishers by increasing the prepolymer softening temperature thus avoiding particle agglomeration and allowing desirably higher solid phase operating temperatures. By utilizing the principles of this invention for preparing prepolymer particles as described above a great number of polyamidation prepolymers such as polyamides made from alkyl, aromatic or heterocyclic diacids and diamines or lactams and their copolymers can be produced for solid phase finishing.

Solid phase finishing of the prepolymer particles may be carried out either with a continuous or discontinuous process. The prepolymer particles may be fed directly into a continuous or batch solid phase polymerizer (8) and thus avoid exposure to the atmosphere with subsequent oxidative degradation and moisture pickup. Also heat economies are inherent in this coupled process in that reheat up to the operating solid state polymerization temperatures can be avoided. However it is also possible to use a discontinuous process and ship prepolymer particles to remote sites for further solid phase processing to goal product properties.

Prepolymer particles formed with the procedures above according to the present invention have surprising process improvement advantages for solid phase processing. U.S. Pat. No. 3,031,433 states that very low polyamide prepolymer molecular weights (<2500) significantly increase the reaction time required for solid phase polymerization. More recent nylon 6 patent disclosures (U.S. Pat. Nos. 3,155,637, 4,539,391 and 4,816,557) indicate solid phase processing residence times of >24 hours for conventionally prepared higher molecular weight polymers. According to the processes of the present invention, nylon 6 molecular weights sufficient for the formation of fibers have been achieved in <12 hours solid phase polymerization by using high velocity gas flow rates (at velocities just below the fluidization point) in a fixed or moving bed solid phase reactor. The high velocity gas stream using a recirculating countercurrent low dew point inert gas such as nitrogen, efficiently strips out monomers at the top of the moving bed. The reduced levels of extractables from the pipeline prepolymerizer (i.e., 3–7% versus the usual 8 to 15% monomer and very low cyclic prepolymers) further improve the efficiency of extraction in the moving bed solid phase polymerizer resulting in total extractables below 2% in the exit product at the bottom of the moving bed. This efficient stripping of extractables in the upper region of the moving bed avoids particle agglomeration by maintaining very low concentrations of extractables at the particle surface thus avoiding particle to particle sticking due to the adhesive nature of extractables.

A second feature of this invention that greatly improves solid phase processing of polyamides especially polycaprolactam is to solidify prepolymer under controlled time temperature (annealed) conditions to raise the softening point and remove secondary crystallization exotherms. This allows the solid phase reactor to operate at significantly higher temperatures (i.e., >170° C.) without particle agglomeration due to particle softening. Operation at these higher temperatures greatly enhances the removal of extractables. Moreover the ability to operate at higher temperatures along with the use of catalysts, especially those containing phosphorus, such as sodium hypophosphite (SHP) and 2-pyridylethyl phosphonic acid (PEPA) and with low dew point inert gases greatly enhance the solid phase reaction rate of both prepolymer and polymer. It is the combination of low extractables, annealed prepolymer, high velocity inert low dew point, higher temperature and high performance catalysts that allow rapid polymerization and nonagglomeration of prepolymer particles in times significantly lower than previous art. There is also no need to use expensive water extraction and subsequent drying steps.

The "off gases" leaving the top of the solid phase finisher can be sent to a separator cooler (9) and then recycled to the prepolymerizer. There is no need to concentrate the exit stream since almost pure caprolactam will be leaving the column. Hot water or steam (10) can be added to the product gas stream off of the solid phase polymerizer to avoid solidification of the caprolactam. Because the prepolymerizer is operating at low residence times there will be low cyclic dimer formation avoiding the need for expensive purification equipment.

A further feature of step B of the process (prepolymer particle formation) of the present invention is that in the case of nylon 6, prepolymer particles formed under controlled temperature conditions do not exhibit exothermic premelting thermograms as opposed to prepolymer particles formed with rapid quench. This lessens particle agglomeration in the solid phase finishing operation through surface softening. It has also been found that rapid heating rates of the prepolymer particle raise the softening temperatures so that particle to particle sticking is avoided in the case of preheating nylon 6 in the initial phases of solid phase finishing. This method of particle preparation in the case of polyamides leads to a preferred crystalline morphology which enhances conditions for solid phase finishing by promoting the formation of the higher melting crystalline forms during the solid phase or annealing finishing step.

EXAMPLES

PREPOLYMER FORMATION IN PIPELINE REACTOR

(PROCESS STEP A)

Example 1

An aqueous caprolactam solution containing 80% by weight of caprolactam at ambient temperature was metered with a positive displacement pump into a vertical coiled pipeline reactor at a polymer feed rate of 1.7 pounds/hr. The reactor coils were submersed in a constant temperature oil bath operated at 272° C. The reactor coil was 15.8 ft long and of 0.43 inches inside diameter. The vertical trombone-shaped coil had 8 turns and was 12 inches high. The reactor pressure was 400 psig (2859 kPa) which was below the solution vapor pressure allowing formation of a steam phase and cocurrent stable two-phase vertical flow. There was also back flow occurring which mixed caprolactam and steam vapors efficiently with prepolymer to improve conversion of caprolactam to above 85%.

The liquid prepolymer residence time was 35 to 40 minutes. The reactor pressure was maintained with a pressure control valve at the exit of the reactor. The two phase reactor effluent next entered the flasher which had been designed to lower the pressure while maintaining a process temperature of 270° C. at a liquid prepolymer temperature of 270° C. The flasher horizontal pipeline coils spiralled downward in an isothermal oil bath and consisted of 6 ft. of 0.09 inch inner diameter tubing followed by two 6 ft long parallel sections of 0.07 inch internal diameter tubing followed by 12 ft of 0.18 inch internal diameter tubing. The flasher coil operated in stable annular flow with a residence time of 2 to 3 minutes.

The flasher effluent flowed into the separator which is an expanded horizontal 1 ft. long, 0.93 inch i.d. section of the flasher. The separator operated in wave-stratified flow and removed the steam-monomer vapors effectively from the prepolymer without foaming or frothing. Liquid residence time was less than 1 minute. The prepolymer flowed or was pumped out of a drop pipe at the bottom of separator. This exit system had very low residence time (i.e., less than 1 minute) to avoid reformation of monomer. Prepolymer sum of terminal ends analysis ranged from 262 to 286, corresponding to molecular weights ranging from 7633 to 6993. Extractable impurities were methanol extracted from dry ice quenched prepolymer. Extractable impurity content was found to consist of 2.8 to 3% weight % monomer and 0.14 to 0.15 wt % cyclic dimer.

Example 2

An 80% aqueous caprolactam solution at 2.13 pph was fed into the reactor configuration under the same conditions as Example 1 except that the flasher exit prepolymer stream was fed by a metering pump into a 275° C. transfer line of about 1 min. holdup time through a 3 mm. diameter die and then into a water trough with a residence time of a few seconds. The quenched strand was then cut into small cylinders. The water quenched prepolymer had an average sum of ends of 288 (6944 Molecular mass) with an extractable impurities content of 5.6% monomer and 0.6% dimer.

Example 3

An 80% aqueous caprolactam solution at 2.13 pph was fed into the reactor configuration at the same conditions as Example 2 except that the transfer line length was doubled and the die was placed over a heated stainless 15 ft. long steel belt operating at 13 ft/min and temperatures of 140 to 155° C. for the crystallization studies described in Example 5. The annealed solidified prepolymer product had an average sum of ends of 285 (7015 Molecular mass) and an extractable impurities content of 6.5% monomer and 0.6 wt % cyclic dimer.

Example 4

80% aqueous caprolactam solution at 2.13 pph was fed to the same configuration as in Example 3 except that 0.03 wt % sodium hypophosphite catalyst (based on the weight of dry caprolactam) was added to the aqueous caprolactam solution. The heated belt annealed prepolymer had an average sum of ends of 280 (7142 Molecular mass) and an extractable impurities content of 6.4% monomer and 0.6% dimer. Crystallization studies of this material are in Example 6.

CRYSTALLIZATION

(PROCESS STEP B)

All of the prepolymer feeds for the crystallization step were prepared by the methods of Examples 1–4 in a continuous, pipeline reactor fed with a mass ratio of (80% caprolactam)/(20% water).

The specific features of the crystallization (Step B) demonstrated are:

1. crystallization at varied temperatures above and below the glass transition temperature;
2. variation of the time the material was exposed to quench conditions;
3. crystallization of material with and without catalyst, e.g., Prepolymers from Examples 1 and 3 were catalyst free. Prepolymer from Example 4 contained 0.03 wt % sodium hypophosphite catalyst.

Example 5

Molten nylon-6 prepolymer from a continuous pipeline reactor and flasher, fed with caprolactam/water 80/20 w/w %, as prepared in Example 3, was cast onto a temperature controlled, heated, steel belt to perform isothermal crystallization from the melt. The belt was maintained below the prepolymer melting point The gas space above the quench zone was heated. The residence time of the prepolymer on the belt was controlled. The solidified prepolymer was then removed from the belt and allowed to passively cool to room temperature. Molten nylon-6 prepolymer from the same source was also quenched on dry-ice as well as in water and on aluminum trays both at room temperature for comparison to those samples quenched near or above nylon-6 glass transition temperature of 60 degrees. The molten nylon-6 prepolymer temperature ranged from 266 to 268° C. Other experimental conditions are listed in Table 1.

TABLE 1

| | Experimental Conditions | | | |
|---|---|---|---|---|---|
| Example | Quench Method | Quench Temp. °C. | Oven Temp. °C. | Belt Speed ft/min | Residence Time (Seconds) |
| 5A (comp) | water | 25 | | | |
| 5C | belt | 133 | 176 | 23.03 | 39.5 |
| 5D | belt | 140 | 175 | 21.71 | 41.9 |
| 5E | belt | 157 | 173 | 17.98 | 50.6 |
| 5F | belt | 165 | 175 | 12.97 | 70.2 |
| 5G | belt | 168 | 175 | 13.04 | 69.8 |
| 5B comp | tray | 25 | | | |

Figure 2:
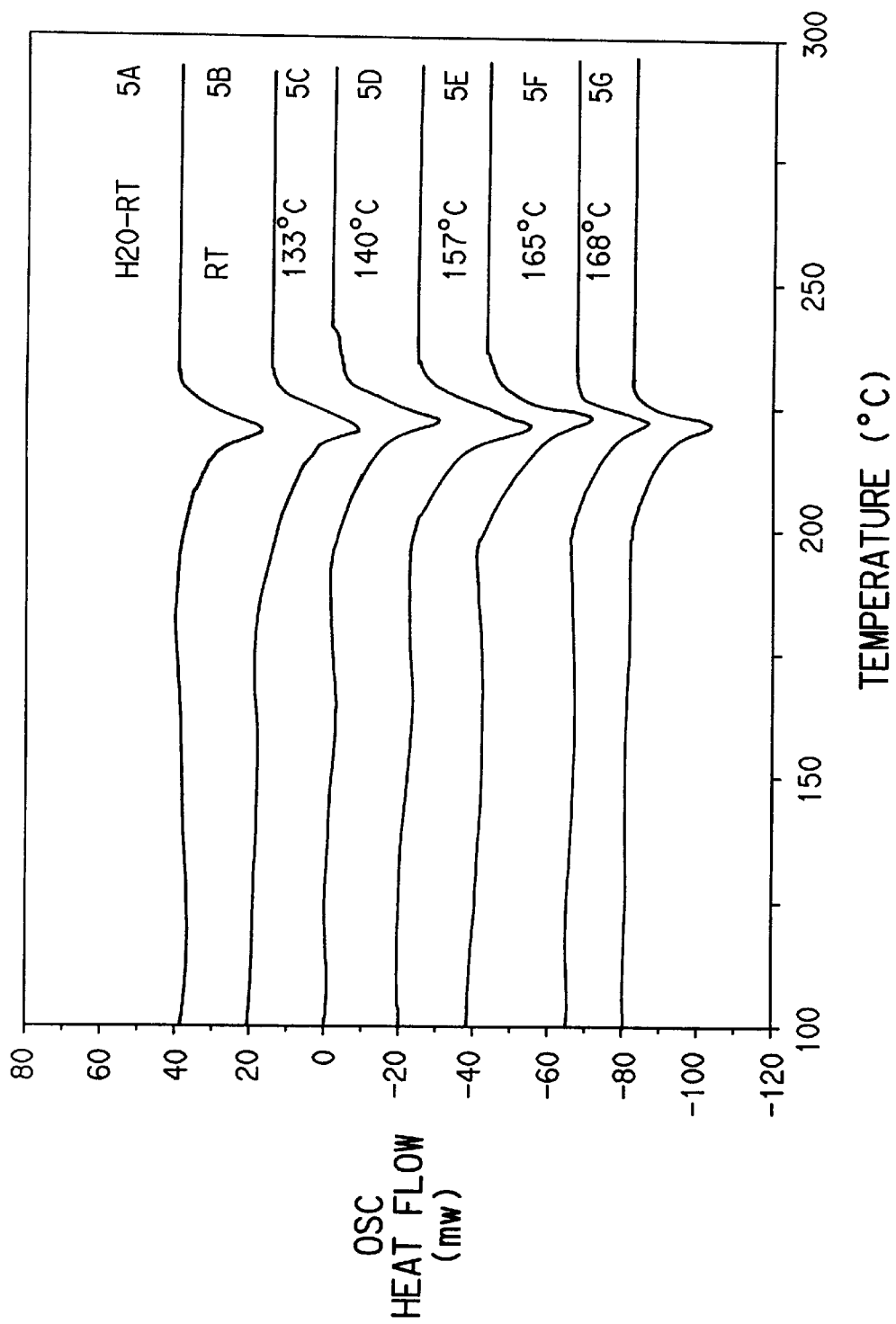
FIG. 2 is a grouping of DSC plots (5A–5G) for the products of Example 5.

The series of Differential Scanning Calorimetry (DSC) analyses in FIG. 2 indicates that increasing quench temperature raises the prepolymer softening point.

Figure 3:
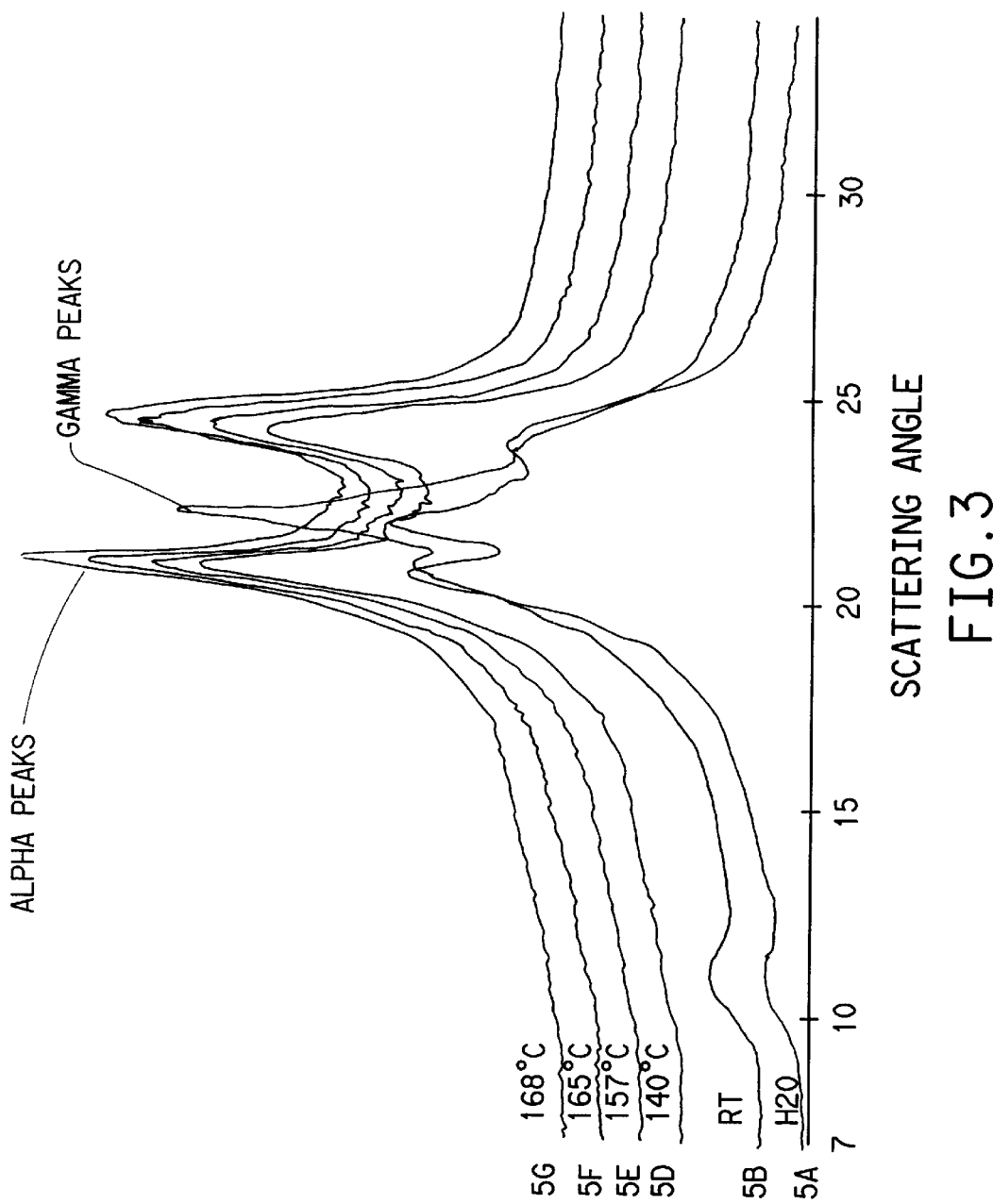
FIG. 3 is a grouping of wide angle x-ray scattering analyses of the products of Example 5.

A series of equatorial scans (FIG. 3) using Wide Angle X-Ray Scattering (WAXS) indicated an increased presence of alpha crystalline morphology when nylon-6 prepolymer was quenched from the melt at a temperature well-above the glass transition temperature. An increased presence of gamma crystalline morphology occurs when nylon-6 prepolymer is quenched at temperatures nearer the glass transition temperature.

Example 6

Molten nylon-6 prepolymer from a continuous pipeline reactor and flasher, fed with caprolactam/water 80/20 w/w % and 0.03 wt % sodium hypophosphite, as prepared in Example 4, was cast onto a temperature controlled, heated, steel belt to perform isothermal crystallization from the melt. The belt was maintained below the prepolymer melting point. The gas space above the quench zone was heated. The residence time of the prepolymer on the belt was controlled The solidified prepolymer was then removed from the belt and allowed to passively cool to room temperature. Molten nylon-6 prepolymer from the same source was also quenched on dry-ice as well as in water and on aluminum trays both at room temperature for comparison to those samples quenched near or above nylon-6 glass transition temperature of 60 degrees. The molten nylon-6 prepolymer temperature ranged from 267 to 268° C. Other experimental conditions are listed in Table 2.

TABLE 2

Experimental Conditions

| Example | Quench Method | Quench Temp. °C. | Belt Speed ft/min | Residence Time (Seconds) |
|---|---|---|---|---|
| 6C | belt | 58 | 12.96 | 70.2 |
| 6D | belt | 133 | " | — |
| 6E | belt | 140 | " | — |
| 6F | belt | 154 | " | 14.58 | 62.4 |
| 6G | belt | 157 | " | 14.53 | 62.6 |
| 6A | water | 25 | | |
| 6B | tray | 25 | | |

Figure 4:
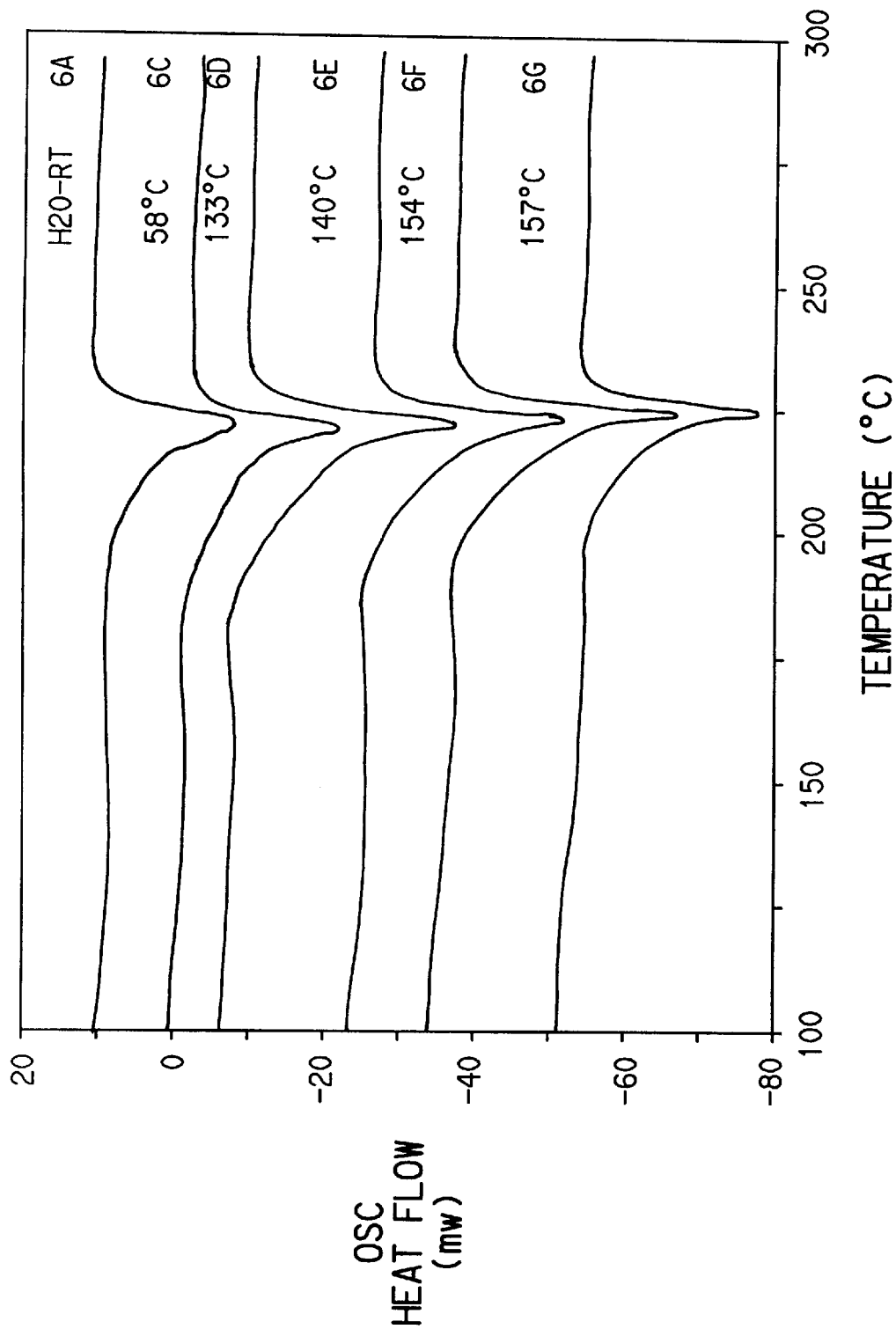
FIG. 4 is a grouping of DSC plots (6A and 6C–6G) for the products of Example 6.

Differential Scanning Calorimetry (DSC) analysis (FIG. 4) indicate increasing quench temperature raises the prepolymer softening point.

Figure 5:
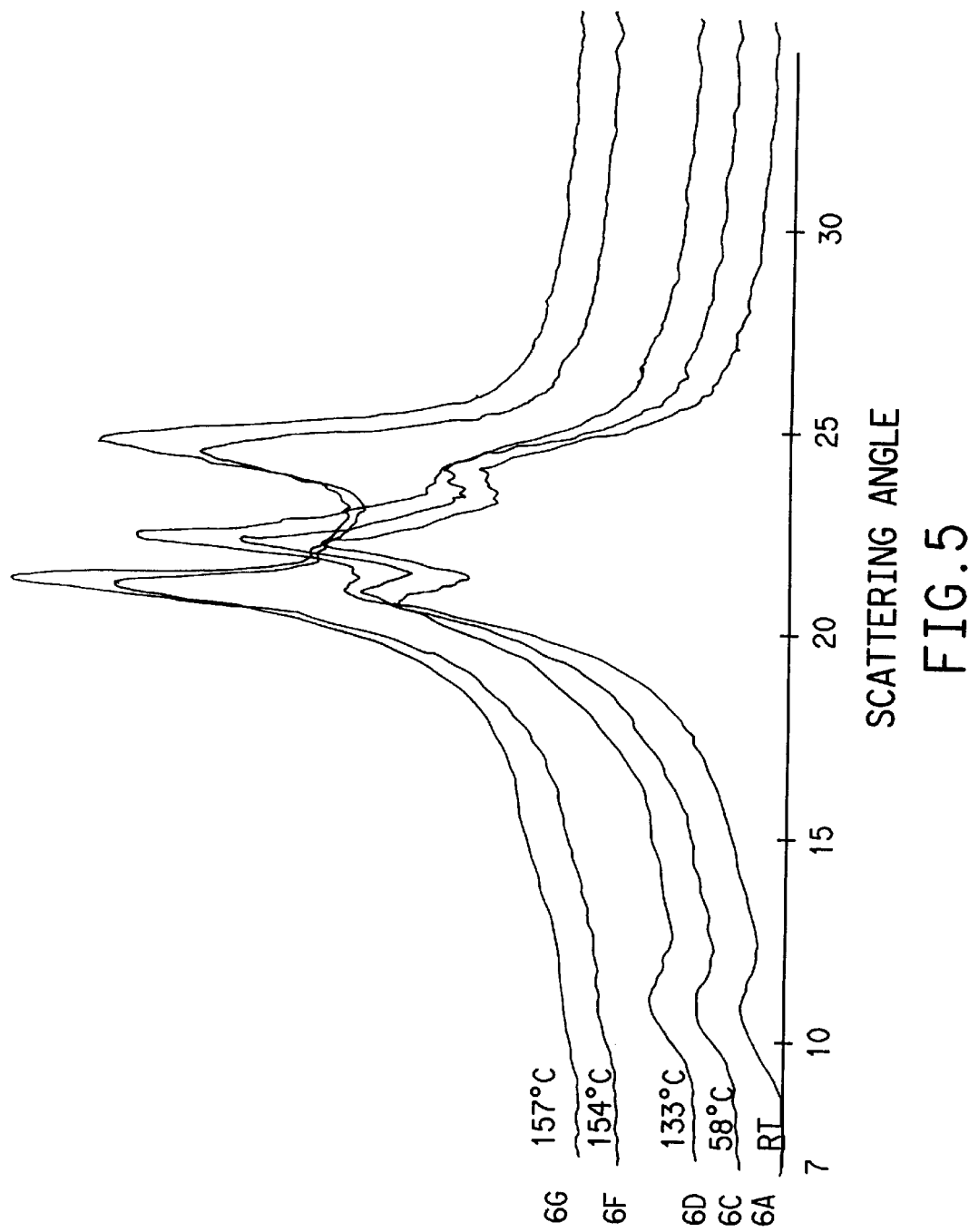
FIG. 5 is a grouping of wide angle x-ray scattering analyses of the products of Example 6.

A series of equatorial scans using Wide Angle X-Ray Scattering (WAXS) (FIG. 5) indicated an increased presence of alpha crystalline morphology when nylon-6 prepolymer was quenched from the melt at a temperature well-above the glass transition temperature. An increased presence of gamma crystalline morphology occurs when nylon-6 prepolymer is quenched at temperatures nearer the glass transition temperature.

Figure 6:
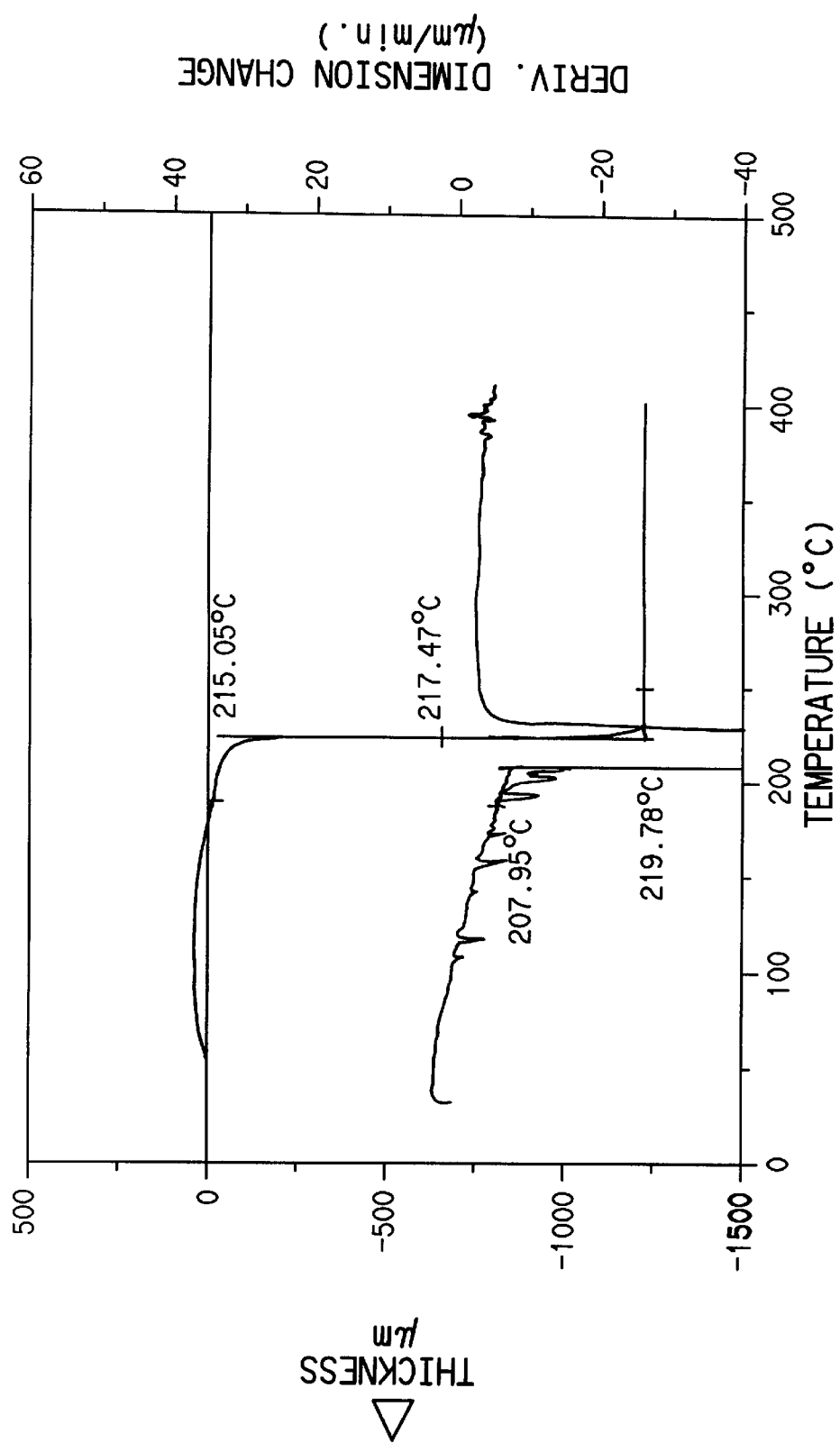
FIG. 6 is a plot of the thermogravimetric analysis of the product of Example 6A.
Figure 7:
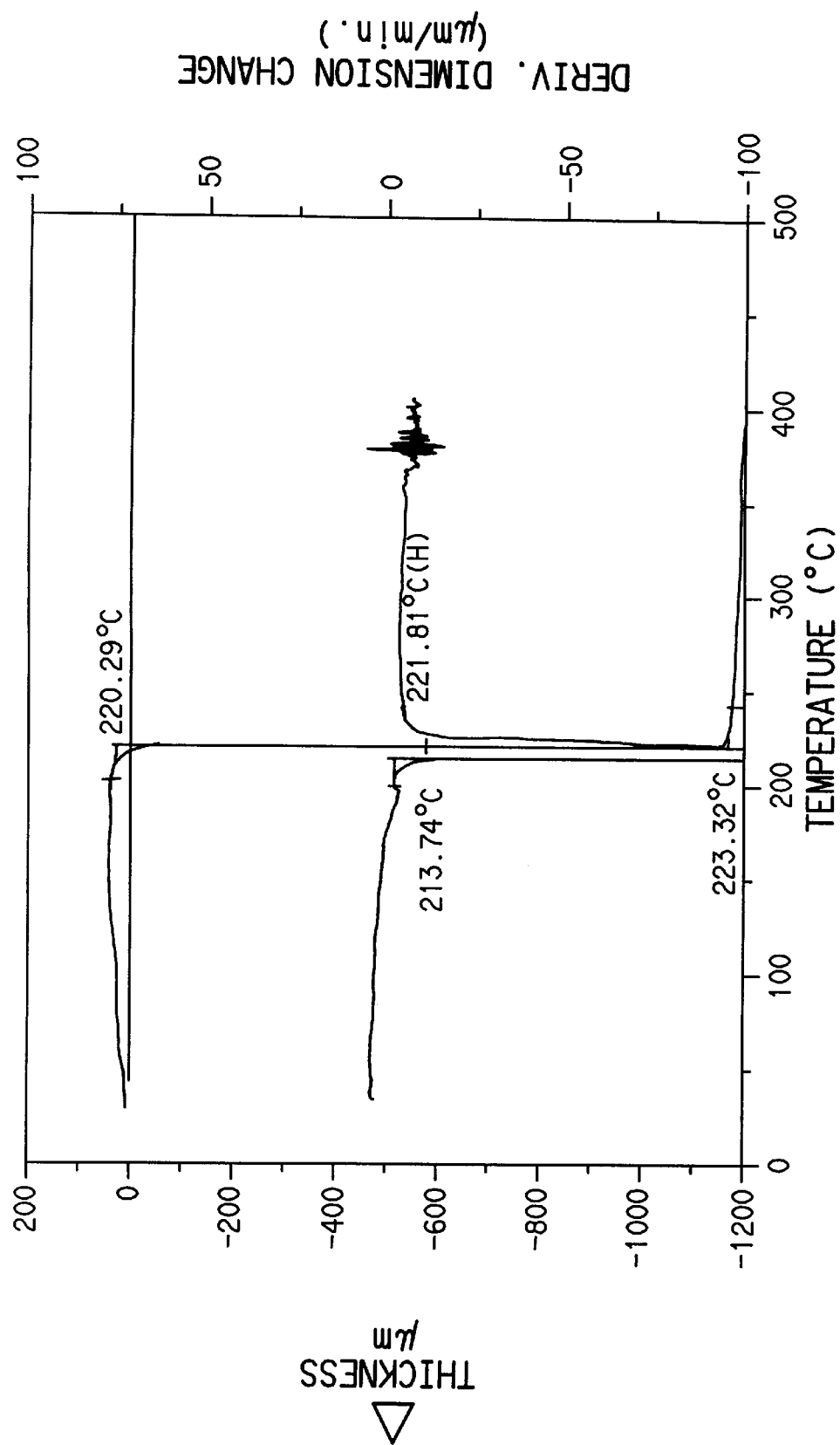
FIG. 7 is a plot of the thermogravimetric analysis of the product of Example 6F.

Thermal Mechanical Analysis of Example 6A and 6F, (FIGS. 6 and 7, respectively) indicate that the softening point of the solidified prepolymer 6F is increased over the water quenched sample 6A.

SOLID PHASE POLYMERIZATION
(PROCESS STEP C)

A) Demonstration of Extractable impurities Removable in Upper Portion of Solid phase Reactor

Example 7

A 160° C. oil-jacketed vertical tubular solid phase reactor having a conical section at the bottom was fed with ambient temperature water-quenched, unextracted, polycaprolactam polymer granules at the top through an unheated feed tube at the rate of 10 pounds/hr. (Zytel® 211, E. I. du Pont de Nemours and Company, Wilmington, Del. was used.) The polycaprolactam feed had an extractable impurities content of 7 wt. % monomer. Nitrogen at 160° C. was introduced into the column through gas distributors and flowed upward at 31 pounds/hr. The superficial nitrogen gas velocity was 0.6 ft/sec (18.3 cm/sec) at ambient conditions. The nitrogen rapidly heated the downward moving polycaprolactam granules in the top few inches to over 100° C. and the remaining lower sections to 159° C. The reactor gas exit temperature was 80° C. 3.0 pounds/hour of steam was injected into the vent line to dilute the caprolactam monomer and prevent pluggage.

Extractable analysis of the product polycaprolactam measured 2.7% as monomer. There was no signs of agglomeration in the granules. The reactor temperature was below the softening temperature.

Example 8

Example 7 was repeated except that nitrogen at 180° C. was fed to the column and the oil jacket was 180° C. The reactor gas exit temperature was 90° C. Extractable analysis of the product measured 0.9% as monomer. Obviously the effective stripping of caprolactam monomer was achieved by the higher operating nitrogen and reactor wall temperatures. However there was appreciable agglomeration of particles because of reactor operation at temperatures above the softening temperature.

Example 9

The water quenched prepolymer from Example 2 of the pipeline reactor was fed into the solid phase reactor described in Examples 7 and 8 under the same conditions except that the solid phase reaction temperature was 180° C. The extractable impurities in the reactor polymer product was 0.8% monomer indicating that extractable impurities could be rapidly reduced from low molecular weight prepolymer in a moving bed continuous solid phase polymerizer. The residence time was about 4 hours which lowered the sum of ends to 192 (10,400 Molecular mass). There were some indications of polymer agglomeration.

Example 10

20 Gram prepolymer samples from Examples 2, 3 and 4, were batch solid phased polymerized in 3.12 cm. inner diameter glass tubes with a nitrogen flow of 65 cc/min. The tubes were immersed in a sand bath operating at 180° C. for 275 minutes. After solid phase polymerization, the water quenched sample from Example 2 analyzed to a 167 sum of ends (12,000 Molecular mass); the belt annealed no-catalyst sample from Example 3 analyzed to a 178 sum of ends (11,200 Molecular mass); the hot belt annealed SHP catalyzed sample from Example 4 analyzed to a 156 sum of ends (12,800 molecular mass). The SHP catalyzed belt annealed material showed a slightly higher rate of SSP. The reaction rates at 180° C. were similar to those previously reported in the literature.

Example 11

The samples used in Example 10 were again run under the same conditions except that the reaction temperature was raised to 210° C. After solid phase reaction for 275 minutes, the water quenched sample from Example 2 analyzed to a 119 sum of ends (16,800 Molecular mass). The hot belt no-catalyst sample from Example 3 analyzed to a 157 sum of ends (12,700 Molecular mass). The SHP catalyzed hot belt annealed sample from Example 4 analyzed to a 68 sum of ends (29,400 Molecular mass).

Example 12

The samples from Examples 2 and 4 were run in the glass tube solid phase polymerizer under Example 11 conditions except that the reaction time was 2 hours. After SSP, the water quenched sample from Example 2 analyzed to a 168 sum of ends (11,900 Molecular mass). The SHP catalyzed hot belt annealed sample from Example 4 analyzed to an 84 sum of ends (23,800 Molecular mass) which is adequate for most fiber and resin products.

Example 13

30 Grams of sample from Example 4 (SHP catalyzed hot belt annealed unextracted prepolymer) was placed in the 3 cm. inner diam. solid phase glass tubes at 170° C. 130 cc/min nitrogen (0.009 ft/sec, 0.28 cm/sec superficial gas velocity at ambient conditions) flowed up through the bed for 2 hours. After cool down, significant polymer agglomeration had occurred because of caprolactam adhesion between particles and between the particles and the walls of the glass reactor.

Example 14

Experiment 13 was repeated except that the nitrogen flow was increased to 2400 cc/min (0.17 ft/sec, 5.2 cm/sec superficial gas velocity at ambient conditions) and the reaction temperature was 190° C. for 1 hour. After cool down all polymer particles flowed easily out of the glass tube and there was no signs of polymer agglomeration or wall sticking.

Example 15
(Conversion of 6-aminocapronitrile to nylon-6 prepolymer in a two-stage reactor—first stage cocurrent, two-phase flow; second stage counter current, two-phase flow).

A 173 ml, non-vented, pipeline reactor was connected to a 100 ml vented bubble column reactor to continuously produce nylon-6 prepolymer from 6-aminocapronitrile and water. A regulating valve was used to join the pipeline reactor to the bubble column reactor to enable operation of each reactor at different pressures. The bubble column was configured to enable the injection of steam at bottom and vent steam, ammonia, and organic vapor from the top. The nylon-6 prepolymer melt moved countercurrent to the vapor phase and exited from the bottom of the column.

The feed stream was composed of a mole ratio of 6-aminocapronitrile to water of 1 to 3. The pipeline and bubble column reactors were maintained at 280° C. Feed was pumped into the pipeline reactor at 2 ml/minute. The pipeline pressure was maintained at 315 psig and the bubble column pressure at 100 psig. One-half gram per minute of steam was injected into the bubble column. Analysis of the prepolymer end groups indicated amine concentration of 81.3 meq/kg and acid concentration of 45 meq/kg.

Example 16
(Nylon 6 prepolymer from 6-aminocapronitrile)

An aqueous solution of 49 wt % 6-aminocapronitrile with 0.1 wt % pyridylethylphosphonic acid at ambient conditions was metered into a multisection vertical coiled pipeline reactor at a total feed rate of 0.84 lb/hr. Section 1 of the reactor is comprised of 59 ft of ½ inch OD, 0.035 wall stainless steel tubing. The coil was immersed in a hot oil bath at 275° C. The internal pressure in this section was maintained at 560 psig by throttling the outlet of this reactor section.

Between section 1 and section 2 of the reactor the reaction mixture was passed through a stationary in-line mixer where 0.41 lb/hr of ambient temperature water was injected. The mixer was immersed in a hot oil bath at 275° C.

The mixture then passed into the second section of the reactor, comprised of 15.8 ft of ½ inch OD, 0.035 wall stainless steel tubing. The section 2 of the reactor was immersed in hot oil at 275° C. The internal pressure in this section of the reactor was maintained at 360 psig by throttling the outlet of the reactor section.

After leaving the second section of the reactor the reaction mixture was passed through a isothermal flasher consisting of 6 ft of 3/16 in OD, 0.049 in wall stainless tubing, then two parallel 6 ft of ⅛ in OD, 0.028 in wall stainless tubing, then 8 ft of 3/16 in, 0.035 in wall stainless tubing, then 12 ft of ¼ in, 0.065 in wall stainless tubing. This tubing was immersed in a hot oil bath at 295° C. The residence time of the flasher is estimated to have been 2 to 3 minutes.

The flasher effluent flowed into the separator stage which is an expanded horizontal 1 ft. long, 0.93 inch i.d. section of the flasher. The separator operated in a wave stratified flow and removed the steam-monomer vapors effectively without foaming or frothing. Liquid residence time was less than 1 minute. The prepolymer was pumped out of a drop pipe at the bottom of the separator. Prepolymer sum of ends(NH$_2$ and COOH) was measured at 134,RV of 15.5 (8.4% polymer in 90 wt % formic acid).

Example 17
(Nylon 6 prepolymer from 6-aminocapronitrile)

An aqueous solution of 75.8 wt % 6-aminocapronitrile with 0.1 wt % pyridylethylphosphonic acid at ambient conditions was metered into the reactor discussed in Example 16 at 0.56 lb/hr. The amount of water injected after sectionl of the reactor was 1.1 lb/hr. All temperatures and pressures were the same as Example 1. Prepolymer sum of ends(NH$_2$ and COOH) was measured at 139,RV of 21.1 (8.4% polymer in 90 wt % formic acid).

Example 18
Nylon 6 prepolymer from 6-aminocapronitrile followed by crystallization An aqueous solution of 49 wt % 6-aminocapronitrile with 0.2 wt % pyridylethylphosphonic acid at ambient conditions was metered into the reactor discussed in Example 1 at 1.68 lb/hr. Section one temperature and pressure were 295° C. and 880 psig respectively. Section 2 temperature and pressure were 295° C. and 880 psig respectively. An RV of 11.01 (8.4% polymer in 90 wt % formic acid) was produced.

This material was cast onto a heated turntable to perform isothermal crystallization from the melt. The residence time on the belt was controlled. The solidified prepolymer was then removed from the belt and allowed to passively cool to room temperature. The molten prepolymer temperature was approximately 290° C. Other experimental conditions are listed in Table 3.

TABLE 3

| | Experimental Conditions | |
|---|---|---|
| Example | Quench Temperature ° C. | Nominal Residence Time (Seconds) |
| 18A | 95 | 30 |
| 18B | 120 | 30 |
| 18C | 130 | 30 |
| 18D | 140 | 60 |
| 18E | 150 | 60 |
| 18F | 160 | 60 |
| 18G | 165 | 60 |

Figure 8:
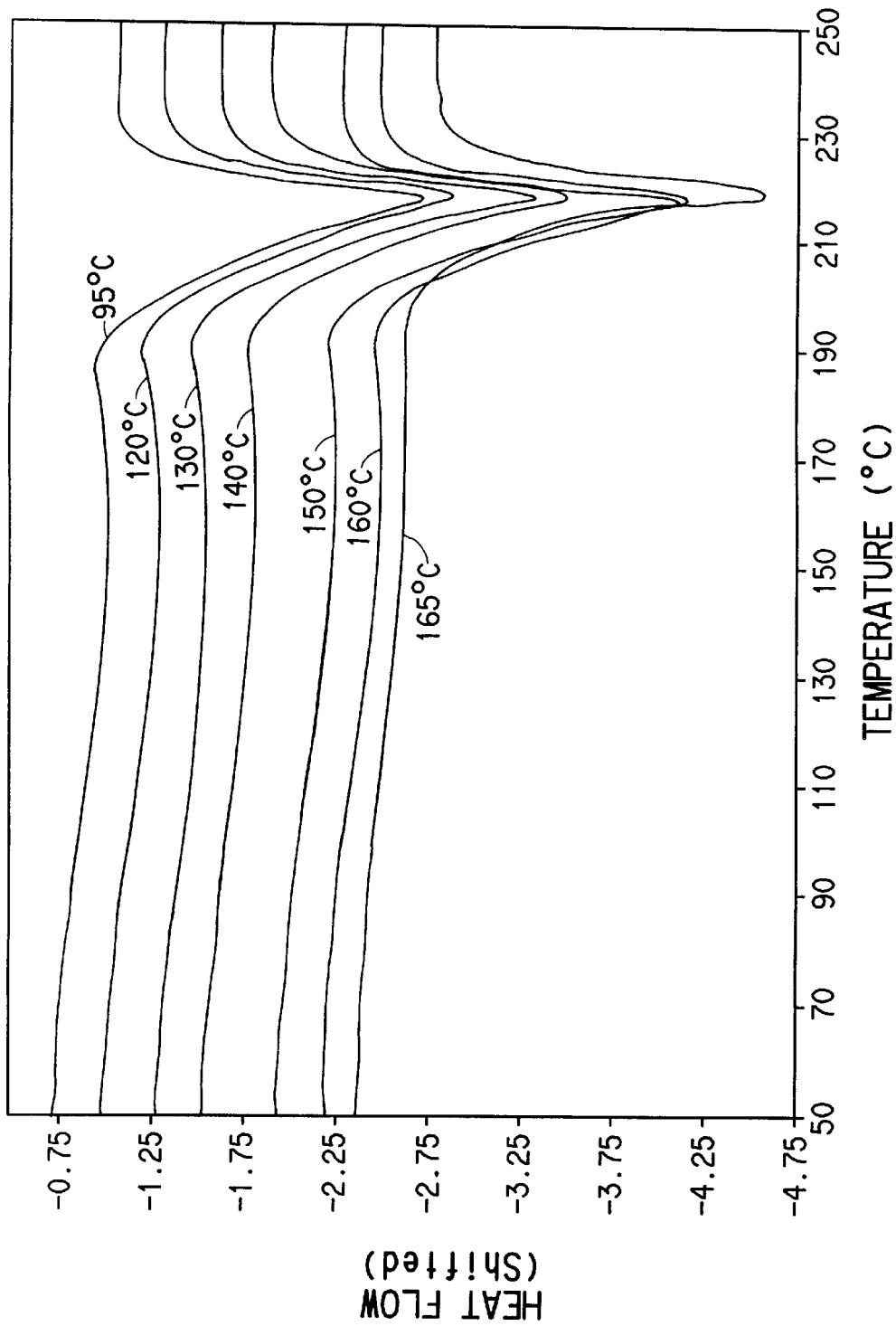
FIG. 8 is a plot of quench temperature vs. prepolymer softening point for the crystallized prepolymers of Example 18.

The series of Differential Scanning Calorimetry(DSC) analyses in FIG. 8 indicate that increasing the quench temperature raises the prepolymer softening point.

Example 19
(Solid Phase Polymerization)

50 grams of the prepolymer prepared in Example 16 was placed in a 32/200 Pyrex® glass trap body for 8 hours at 195° C. Preheated nitrogen gas was passed upward through the prepolymer at a flow rate of 0.085 scfm. Polymer RV (8.4% polymer in 90 wt % formic acid) was increased from 15.2 to 66.4.

What is claimed is:

1. A process for the preparation of polyamide prepolymers, possessing less than about 6% of extractable impurities, comprising the step of:

(a) prepolymerizing a polyamidation precursor selected from the group consisting of a polyamidation monomer, a mixture of polyamidation monomers, and a mixture of polyamidation monomers and comonomers in a polyamidation reactor, in the presence of a flowing vapor phase for between 10–600 minutes at pressures between 10 bar (145 psig, 130.3 psig, 1000 kPa) and the system vapor pressure so that boiling occurs resulting in operation in a two phase (vapor phase/liquid phase) region to form a polyamide prepolymer;

(b) flashing excess dissolved liquid water and reaction product volatiles into the vapor phase by passing the liquid prepolymer solution/vapor stream through a flasher stage that follows the reactor to let down the pressure to approximately 1 atmosphere (101 kPa) and to strip off the extractable impurities; and (c) passing the flasher effluent through a very low holdup time separator at about 1 atm. (101 kPa) that follows the flasher.

2. A process for the preparation of polyamide prepolymers, possessing less than about 6% of extractable impurities, comprising the steps of:

(a) prepolymerizing a caprolactam polyamidation precursor in a polyamidation reactor, in the presence of a flowing vapor phase for between 10–600 minutes at pressures between 10 bar (145 psig, 130.3 psig, 1000 kPa) and the system vapor pressure so that boiling occurs resulting in operation in a two phase (vapor phase/liquid phase) region to form a polyamide prepolymer;

(b) flashing excess dissolved liquid water and reaction product volatiles into the vapor phase by passing the liquid prepolymer solution/vapor stream through a flasher stage that follows the reactor to let down the pressure to approximately 1 atmosphere (101 kPa) and to strip off the extractable impurities; and (c) passing the flasher effluent through a very low holdup time separator at about 1 atm. (101 kPa) that follows the flasher.

3. The process of claim 2 wherein the flowing vapor is flowing concurrently with the process material and wherein the time in step a) is between 10 minutes and 180 minutes.

4. The process of claim 2, wherein the reactor is a pipeline reactor.

5. The process of claim 2 wherein the temperature in step a is 190° C. to 320° C.

6. The process of claim 2 wherein the pressure in step a is above 250 psig but below the solution vapor pressure.

7. The process of claim 3 wherein the liquid residence time in step a is between 10 minutes and sixty minutes.

8. A process for the preparation of polyamide prepolymers, possessing less than about 6% of extractable impurities, comprising the steps of:

(a) prepolymerizing an amino nitrile monomer, polyamidation precursor in the presence of a flowing vapor phase for between 10–600 minutes at pressures between 10 bar (145 psig, 130.3 psig, 1000 kPa) and the system vapor pressure so that boiling occurs resulting in operation in a two phase (vapor phase/liquid phase) region to form a polyamide prepolymer, (b) flashing excess dissolved liquid water and reaction product volatiles into the vapor phase by passing the liquid prepolymer solution/vapor stream through a flasher stage that follows the reactor to let down the pressure to approximately 1 atmosphere (101 kPa) and to strip off the extractable impurities; and (c) passing the flasher effluent through a very low holdup time separator at about 1 atm. (101 kPa) that follows the flasher.

9. The process of claim 8 wherein the amino nitrile monomer is 6-aminocapronitrile.

10. The process of claim 9 wherein the 6-aminocapronitrile is supplied as an aqueous solution.

11. The process of claim 8 wherein additional water is injected in step (a) to facilitate the removal of reaction byproducts.

12. The process of claim 8 wherein venting of byproducts is done during or after step (a).

13. The process of claim 8 carried out in a presence of a polyamidation catalyst.

14. The process of claim 13 wherein after step (a) and before step (c), an aqueous solution of a polyamidation catalyst deactivator is injected.

15. The process of claim 14 wherein the polyamidation catalyst deactivator is selected from the group consisting of potassium carbonate and potassium bicarbonate.

16. The process of claim 8 wherein the pressure in step (a) is between 300 psig (2170 kPa) and the solution vapor pressure.

17. The process of claim 8 wherein the reaction time in process step (a) is 60 minutes to 450 minutes.

18. A process for the preparation of crystalline polyamide prepolymers, comprising crystallizing a polyamide prepolymer having a molecular weight between 3,000 and 10,000 essentially isothermally at a temperature (Tc) within plus or minus 20° C. of the temperature of maximum crystallization rate, provided that Tc is 30 or more degrees below the melting point of the polyamide prepolymer.

19. A process for the preparation of crystalline polyamide prepolymers, comprising crystallizing a polyamide prepolymer having a molecular weight between 3,000 and 10,000 essentially isothermally at a temperature (Tc) within plus or minus 20° C. of the temperature of maximum crystallization rate, provided that Tc is 30 or more degrees below the melting point of the polyamide prepolymer wherein the polyamide prepolymer is a nylon 6 polyamide prepolymer, essentially isothermally, at a temperature of about 130° C. to 170° C.

20. The process of claim 19 wherein the temperature is from 140° C. to 160° C.

21. The process of claim 19 wherein the polyamide prepolymer to be crystallized is prepared by the process of claims 2 or 8.

22. A process for the preparation of high molecular weight polyamide polymer comprising the steps of:

(a) crystallizing a polyamide prepolymer according to the process of claim 18 or 21; and (b) solid state polymerizing the crystallized polyamide prepolymer, in the presence of a inert gas having a superficial gas velocity of about 0.1 to 2 ft/sec., and at temperatures of at least about 1° C. below the softening point of the crystallized polyamide prepolymer as indicated by DSC curves.

23. The process of claim 22 wherein the inert gas contains less than about 30 volume % water vapor.

24. The process of claim 22 wherein the inert gas contains less than about 10 volume % water vapor.

25. The process of claim 22 wherein the inert gas contains less than about 5 volume % water vapor.

26. The process of claim 22 wherein the solid state polymerization is carried out at least about 5° C. below the softening point of the crystallized polyamide prepolymer as indicated by DSC curves.

27. A product prepared by the process of claim 22.

28. A process for rapid solid phase processing and vapor phase extraction of impurities of nylon 6 polyamide polymers or their copolymers comprising:
  (i) supplying low extractable content crystalline nylon-6 polyamide prepolymers or copolymers to a solid state polymerizer; and
  (ii) solid state polymerizing in the presence of an inert gas having a superficial gas velocity of about 0.1 to 2 ft/sec. and at temperatures of at least about 1° C. below the softening point as indicated by DSC curves, wherein polyamide precursor is removed and molecular weight of the resulting polymer is increased.

29. The product of claim 28 wherein the total extractables in the product are less than 2%.

* * * * *